F. CUTTING AND B. WASHINGTON.
PRODUCTION OF ELECTRICAL CURRENT PULSES.
APPLICATION FILED JUNE 26, 1918.

1,377,059.

Patented May 3, 1921.

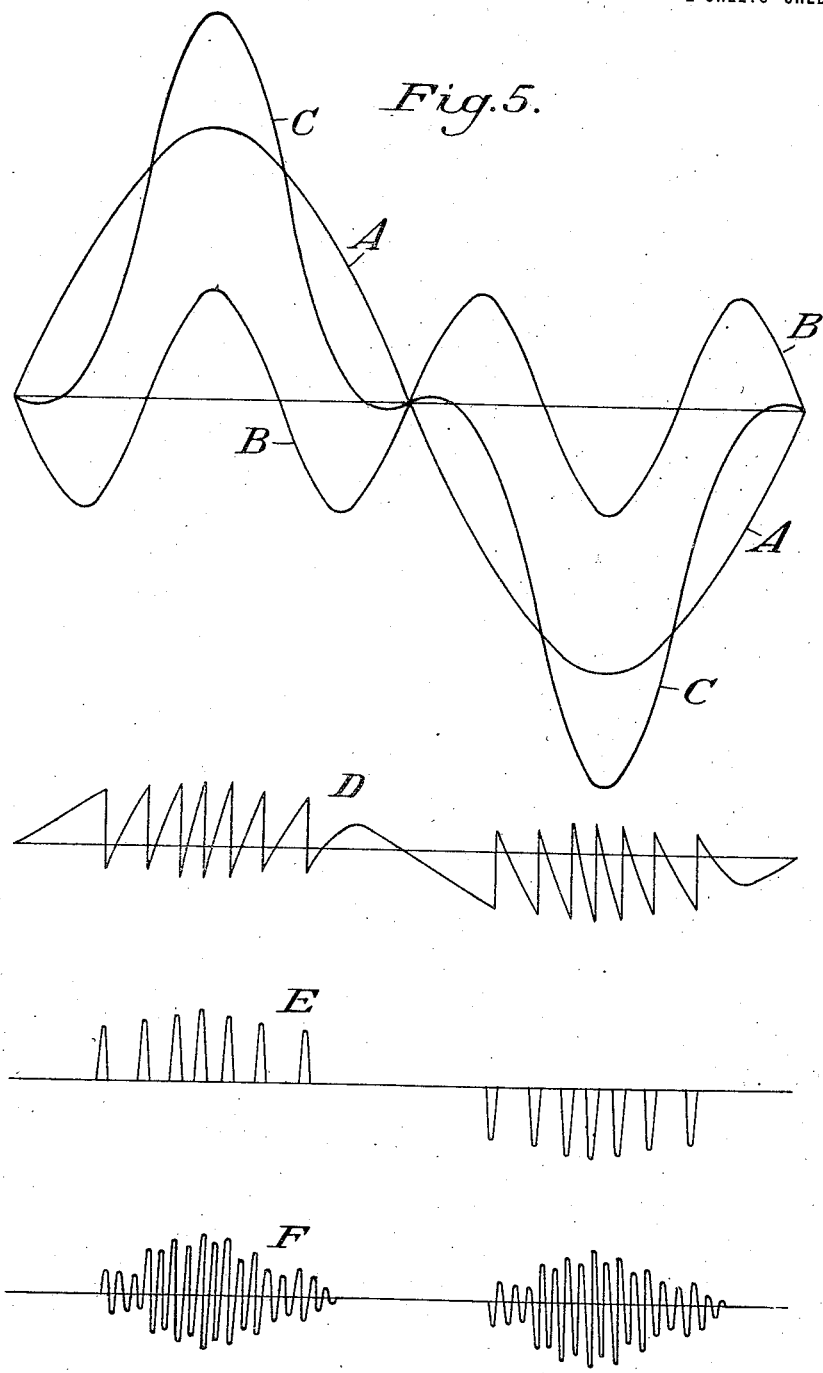

UNITED STATES PATENT OFFICE.

FULTON CUTTING, OF TUXEDO PARK, NEW YORK, AND BOWDEN WASHINGTON, OF CAMBRIDGE, MASSACHUSETTS.

PRODUCTION OF ELECTRICAL-CURRENT PULSES.

1,377,059.   Specification of Letters Patent.   Patented May 3, 1921.

Application filed June 26, 1918. Serial No. 242,070.

*To all whom it may concern:*

Be it known that we, FULTON CUTTING and BOWDEN WASHINGTON, both citizens of the United States, and residents, respectively, of Tuxedo Park, Orange county, New York, and Cambridge, Middlesex county, Massachusetts, have invented a new and useful Improvement in the Production of Electrical-Current Pulses, of which the following is a full, clear, and exact description, reference being had to the accompanying drawings, forming part of this specification, in which—

Fig. 5 is a diagrammatic view, illustrating in a general way what is believed to be the current relations in the circuits illustrated in Figs. 1 to 4.

Figure 1:
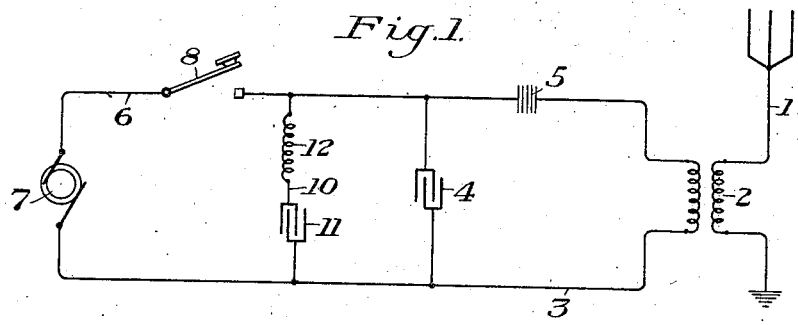
Figure 1 is a wiring diagram showing one embodiment of the invention.

The present invention relates to apparatus for producing electrical current pulses separated by periods during which there is substantially no current. It relates particularly to the production of an alternating current in which each phase or alternation is separated from preceding and succeeding alternations by periods of substantially no current flow. The present invention is particularly applicable to radio telegraphy in which waves of audible group frequency are generated, and is particularly applicable to the system of radio telegraphy described in our co-pending application, Serial No. 134,812, filed December 4, 1916, now United States Patent No. 1,345,352, issued July 6, 1920. As disclosed in said application, a feed current is employed having a peaked wave shape, the peaks being separated by periods of substantially no current flow. This form of wave shape produces periods of high frequency activity separated by periods of inactivity, which is especially useful where telephones are used in the receiving apparatus, as a maximum response may be obtained in the telephones.

In the preferred embodiment of the invention, an alternating current generator, preferably of the usual five hundred cycle commercial type, furnishes the feed current for charging the condenser, and the wave shape of the feed current is modified by the action of an auxiliary or so-called "concentration circuit." The concentration circuit is a resonant circuit which absorbs energy at the beginning and end of each wave or alternation of the current supplied by the alternator and restores energy during the middle of the wave, thus producing shortened and peaked waves separated by periods of substantially no activity.

Referring to the illustrated embodiment of the invention, an oscillation or radiating circuit 1 is provided with the usual antenna and ground, and is coupled by a transformer 2 with a discharge circuit 3. The discharge circuit 3 is provided with a condenser 4 and discharge gap 5, preferably a cooled quenched gap. The condenser 4 is charged through a feed circuit 6, which includes the alternating current generator 7 and usual sending key 8. The system so far described is substantially that indicated in our Patent No. 1,345,352. It is a modification of the Chaffee system, shown in the patent of Emory L. Chaffee, No. 1,189,791, but employs a symmetrical discharge gap and an alternating, instead of a direct, feed current. The discharge gap and coöperating parts of the system are preferably so constructed and arranged as to give substantially perfect quenching, and to produce the oscillations in the oscillation circuit 1 by impact excitation from unidirectional condenser discharges in the discharge circuit 3. It is to be understood, however, that the invention is not limited to such a system, but may be employed in other systems of radio communication or for other purposes in which current pulses of the character herein described are desired.

The usual commercial five hundred cycle generator gives alternating current having an approximately sinusoidal wave shape. This wave shape is modified so that an alternating current having decidedly peaked waves or pulses separated by periods of substantially no current flow, is impressed on the condenser 4. This modification of the alternator current is obtained by means of the concentration circuit 10 which contains a condenser 11 and an inductance 12. In the circuit connections shown in Fig. 1, this concentration circuit is connected across the feed circuit 6 and in shunt with the condenser 4. The condenser 11 and inductance 12 of the concentration circuit 10 are so proportioned that the circuit has a natural frequency of about three times the frequency of the alternator 7. In case of a five hundred cycle alternating current, the concentration circuit 10 should have a natural frequency of about fifteen hundred cycles per second.

For the sake of more graphically presenting what we believe to be the current relations, we have diagrammatically shown them in Fig. 5 of the drawings. It is to be understood, however, that Fig. 5 is intended for the purposes of explanation and does not purport to show exactly the current values or relations.

The alternator 7 impresses on the system an alternating current which is indicated by reference character A, and is shown as an approximately sinusoidal wave. During the first third of each alternation (and by alternation we mean a half cycle) the current is absorbed by the concentration circuit. After the condenser 11 is charged, the current in 10 reverses and flows with the feed current into the condenser 4, which charges and discharges rapidly, causing high frequency currents in the oscillation or antenna circuit 1. This period of activity is followed by a period during about the last third of the alternation, when the current in the concentration circuit again reverses and it absorbs the feed current, so that no sparking at the gap occurs. The current in the concentration circuit is believed to have a wave shape approximately like that indicated at B in Fig. 5. The resultant current impressed on the condenser 4 is, of course, the algebraic sum of the currents A and B, and is indicated at C in Fig. 5. The resultant current has the peculiar wave shape, consisting of a peak of high current flow bordered on either side by periods of substantially no current flow. During the peak of the condenser charging current, the condenser 4 is rapidly charged, and discharges through the gap 5. The condenser voltage is indicated at D in Fig. 5. The condenser discharges through the gap are indicated at E in Fig. 5. Each of the condenser discharges E acts by impulse excitation to cause a train of high frequency oscillations in the antenna or oscillation circuit 1. The condenser discharges E are so closely spaced that the antenna oscillations set up by one condenser discharge do not have an opportunity to die down before the next discharge takes place. The condenser discharges are triggered off and come in to boost the declining oscillations in the antenna circuit, substantially as described in Chaffee Patent No. 1,189,791, and our Patent No. 1,345,352 above mentioned. The oscillations in the antenna circuit form a group indicated at F in Fig. 5. The outline or envelop of the group has a shape similar to the condenser charging current wave C. The groups of radiated oscillations F are discrete, that is, separated from the preceding or succeeding groups by periods of inactivity which are preferably approximately equal to the duration of the groups themselves. Of course, during the intervening period of inactivity, the oscillations do not entirely die out, but do become negligible in strength. When telephones are used at the receiver, the telephones are acted upon by power waves which have the same duration and substantially the same shape as the envelops of the radiated oscillations. For the maximum effect on the telephones, there should be a period of inactivity between the waves at least long enough to allow the telephone diaphragm to swing back during the alternation opposite to that during which it is energized. This condition is obtained in the present system by the periods of inactivity between the peaks of the condenser charging current, during which periods the feed current is being absorbed by the concentration circuit.

Figure 2:
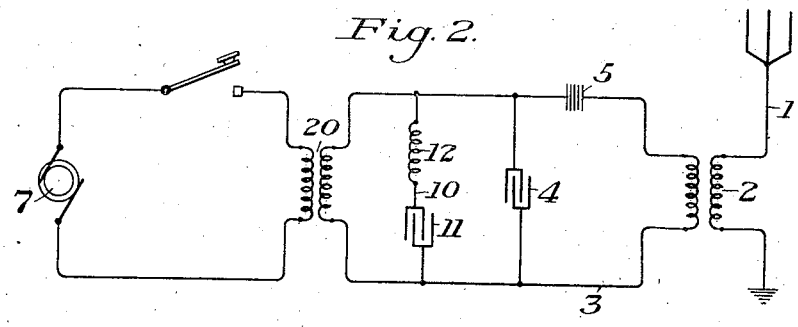
Figs. 2, 3 and 4 are wiring diagrams showing modification.
Figure 3:
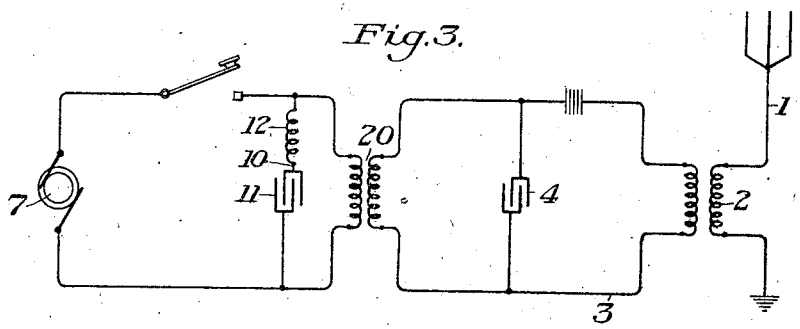
Figure 4:
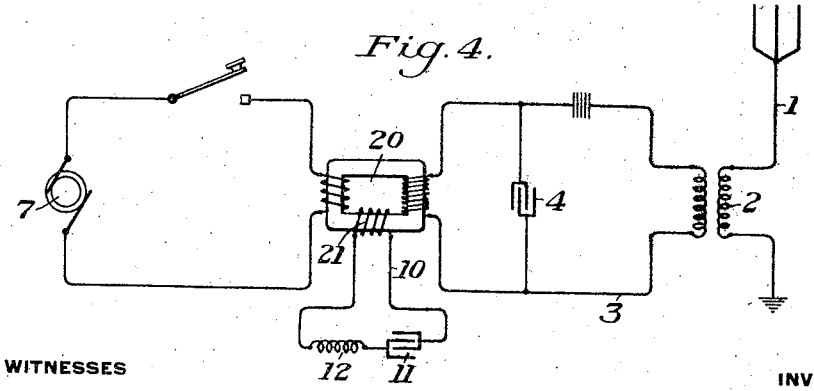

The wiring diagram shown in Fig. 1 of the drawings, illustrates the concentration circuit as applied to a system in which the generator 7 is connected directly to the primary condenser 4. The concentration circuit may, however, be connected in different ways. For example, if a transformer 20 is used between the generator 7 and the primary condenser 4, the concentration circuit may be placed across the secondary, as shown in Fig. 2, or across the primary, as shown in Fig. 3; or the concentration circuit may be connected to the transformer by means of a special winding 21 thereon, as shown in Fig. 4. The wiring diagrams in Figs. 1 to 4 inclusive, are not intended to show all of the ways in which the concentration circuit may be connected, as it will be apparent to those skilled in the art that it may be otherwise connected to perform its function of absorbing and restoring energy to cause periods of high frequency activity separated by periods of substantial inactivity.

While we have explained the theory of the invention as it is understood by us at the present time, it is to be understood that the invention is not limited to the explained theory. Neither is the invention limited to its preferred embodiment, but may be otherwise embodied within the scope of the following claims.

We claim:

1. Apparatus for producing electrical oscillations, comprising an oscillation circuit, means for producing oscillations therein including a condenser and a discharge gap, a feed circuit including an alternating current generator for charging the condenser, and an auxiliary circuit operatively associated with the feed circuit containing inductance and capacity and having a natural frequency of about three times that of the alternating current; substantially as described.

2. Apparatus for producing an alternating current having its waves or alternations separated by periods of substantially no current flow, comprising an alternating current generator, and a resonant circuit associated therewith and having a natural frequency about three times that of the alternating current generator; substantially as described.

3. Apparatus for producing electrical oscillations, comprising an oscillation circuit and means for producing oscillations therein including a condenser and discharge gap, a feed circuit including a pulsating current source for charging the condenser, and an auxiliary circuit associated with the feed circuit and having a natural frequency about three times that of the pulsating feed current, substantially as described.

4. Apparatus for producing electrical oscillations, comprising an oscillation circuit and means for producing oscillations therein including a condenser and discharge gap, a feed circuit including a pulsating current source for charging the condenser, and means for absorbing energy from the feed current at the beginning and end of each current pulse and restoring the absorbed energy during the middle of each current pulse, substantially as described.

5. Apparatus for producing an alternating current having its waves or alternations separated by periods of substantially no current flow, comprising an alternating current generator, and a circuit containing inductance and capacity associated therewith so tuned with relation to the frequency of the alternating current as to absorb energy at the beginning and end of each current alternation and restore the absorbed energy during the middle of each current alternation, substantially as described.

6. Apparatus for producing current pulses separated by periods of substantially no current flow, comprising a pulsating current source, and a circuit containing inductance and capacity associated therewith so tuned with relation to the frequency of the pulsating current as to absorb energy from the feed current at the beginning and end of each pulsation and restore the absorbed energy during the middle of each pulsation, substantially as described.

7. Apparatus for producing current pulses separated by periods of substantially no current flow, comprising a pulsating current source, and a circuit containing inductance and capacity associated therewith and having a natural frequency about three times that of the pulsating current source, substantially as described.

8. Apparatus for producing current pulses separated by periods of substantially no current flow, comprising a pulsating current source, and a circuit containing inductance and capacity associated therewith and having its natural frequency an odd harmonic of that of the pulsating current source, substantially as described.

In testimony whereof we have hereunto set our hands.

FULTON CUTTING.
BOWDEN WASHINGTON.